United States Patent [19]

Mohr et al.

[11] Patent Number: 5,572,658
[45] Date of Patent: Nov. 5, 1996

[54] NETWORK INTERFACE

[75] Inventors: Thomas Mohr, Buehl; Claus Schmiederer, Renchen; Robert Kern, Sasbachwalden; Gerhard Decker, Achern, all of Germany

[73] Assignee: Robert Bosch GmbH, Stuttgart, Germany

[21] Appl. No.: 392,924

[22] PCT Filed: Aug. 5, 1993

[86] PCT No.: PCT/DE93/00686

§ 371 Date: Feb. 27, 1995

§ 102(e) Date: Feb. 27, 1995

[87] PCT Pub. No.: WO94/06081

PCT Pub. Date: Mar. 17, 1994

[30] Foreign Application Priority Data

Sep. 2, 1992 [DE] Germany .......................... 42 29 175.5

[51] Int. Cl.⁶ .............................. G06F 11/16; G06F 11/00
[52] U.S. Cl. ........................................................ 395/182.02
[58] Field of Search ..................... 371/29.5, 11.2, 371/8.2; 370/16, 43, 85.1; 318/618; 56/10.2 H; 364/431.04, 424.01

[56] References Cited

U.S. PATENT DOCUMENTS

| | | | |
|---|---|---|---|
| 5,216,674 | 6/1993 | Peter et al. | 371/29.5 |
| 5,321,689 | 6/1994 | Suzuki et al. | 370/16 |
| 5,323,385 | 6/1994 | Jurewicz et al. | 370/43 |
| 5,357,518 | 10/1994 | Peter | 371/11.2 |
| 5,391,970 | 2/1995 | Chaffee et al. | 318/618 |
| 5,394,678 | 3/1995 | Lonn et al. | 56/10.2 H |
| 5,444,626 | 8/1995 | Schenk | 364/431.04 |
| 5,448,561 | 9/1995 | Kaiser et al. | 370/85.1 |

FOREIGN PATENT DOCUMENTS 3826774  8/1990  Germany .

OTHER PUBLICATIONS

"Hardware Implementation of a Multiplex Wiring System", by A. R. Whittard and A. Woodworth, IEE Colloq. No. 138: Vehicle Networks for Multiplexing and Data Communication, 1988, p. 10/1–10/3.

"The Immunity of RF Interference of a CAN System", by R. T. McLaughlin, IEE Colloq. No. 063: The Integrity of Automotive Electronic Systems, 1993, p. 4/1–4/8.

*Primary Examiner*—Kevin J. Teska
*Assistant Examiner*—Russell W. Frejd
*Attorney, Agent, or Firm*—Michael J. Striker

[57] ABSTRACT

A network interface is designed for two-wire reception via a serial bus and has a differential receiver which is connected to input lines. The network interface likewise has an element for recognizing error states on the bus lines. It is designed such that it changes into single-wire operation after recognizing the error state, in order to maintain the data traffic. In this case, one input line is connected to a fixed terminal potential. The terminal potential is in this case selected such that the magnitude of the potential difference between the two input lines is the same for both bit levels.

8 Claims, 3 Drawing Sheets

NETWORK INTERFACE

BACKGROUND OF THE INVENTION

Prior Art

The invention is based on a network interface of for a serial bus having at lest two bus lines. A network interface is already known from DE-OS 38 26 774. The network interface described there is designed for use in the so-called Controller Area Network (CAN). The CAN is a serial bus system which is primarily designed for use in motor vehicles. In this case, the information is transmitted between a plurality of network subscribers via a two-wire link. Each network subscriber contains a network interface. Each network interface is connected to the two-wire link. Each network interface has a differential receiver whose inputs are linked to the two-wire link. In the event of one of the two signal lines failing as a result of a short-circuit or interruption, two-wire reception is no longer possible. The network interface according to DE-OS 38 26 774 is designed such that it recognizes error states of the above type and then switches over from two-wire reception to single-wire reception. For this purpose, it applies a fixed terminal potential to one input line of the differential receiver. If differential reception is possible again subsequently to this, the terminal potential remains connected to the input line and information reception takes place via the remaining signal line. In other cases, the terminal potential is applied to the other signal line and the terminal potential is disconnected from the first signal line. After this, information reception can take place via the other signal line. In both cases, the same terminal potential is applied to the respective signal line. The terminal potential in this case corresponds to the comparator mid-potential. When the network interface is in single-wire operation, common mode interference resulting, for example, from an earth offset between two network subscribers, cannot be completely suppressed. The permissible earth offset is governed by the voltage difference between the terminal potential and the recessive bit level on one of two signal lines.

SUMMARY OF THE INVENTION

Accordingly, it is an object of the present invention to provide a network interface which avoids the disadvantages of the prior art.

In keeping with these objects and with others which will become apparent hereinafter, one feature of the present invention resides, briefly stated, in a network interface which has a first further means which set the magnitude of the voltage difference between two input lines during error-free operation to a different magnitude for both bit levels, and in that the network interface has second further means which set the terminal potential for the respective input line in accordance with the formulae:

$UK0=(U_{RX1}(dom)+U_{RX1}(rec))/2$ and $UK0=(U_{RX0}(dom)+U_{RX0}(rec))/2$ $U_{RX1}(dom)$ and $U_{RX1}(rec)$ representing a respective input potential for one of the two bit levels on one of said input lines, and $U_{RX0}(dom)$ and $U_{RX0}(rec)$ representing a respective input potential for one of the two bit levels on the other of said input lines.

In contrast, the network interface according to the invention having the characterizing features of the The network interface according to the present invention has the advantage that the permissible earth offset is equal and a maximum for both bit levels (recessive and dominant). In consequence, a greater safety margin is achieved for data transmission. This is primarily important for bus links which are intended to be designed to be error tolerant, for example where controllers in commercial vehicles are connected.

It is particularly advantageous to provide two controllable switches and one resistor network in the network interface, and to design the switches such that one input line is in each case connected to one bus line in its first switching state and one input line is in each case connected to a point on the resistor network in a second switching state. Single-wire operation of the network interface can thus be implemented without any major hardware outlay. As a result of the controllable switches being designed such that, in their one switching state, they connect different input lines to different points on the resistor network, it is easily possible to connect different terminal potentials to the input lines.

It is furthermore advantageous to design the resistor network such that, when both switches apply their terminal potential to the input line, the recessive bit level is present on the two input lines. In consequence, a network interface can take part in the bus traffic once again more quickly after a bus off state, irrespective of the bus traffic. Specifically, the CAN protocol specifies a minimum number of bit level samples with a recessive bit level before a network interface may leave a bus off state. It is likewise advantageous to provide a voltage divider for each input line. In this way, the level changes can be matched to the operating range of the differential receiver.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
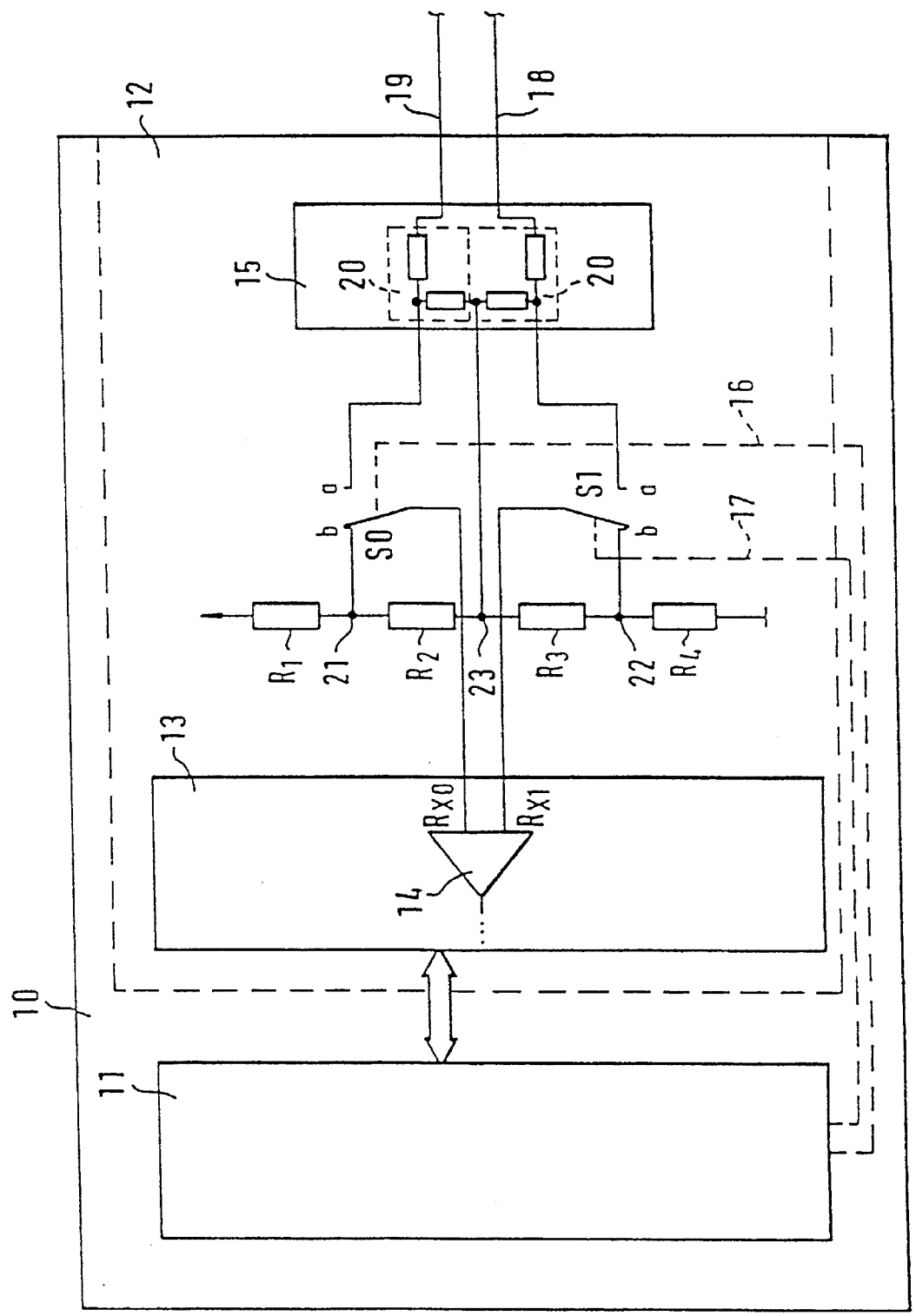
FIG. 1 shows a schematic illustration of a controller having a network interface according to the invention.

An exemplary embodiment of the invention is illustrated in the drawing and is explained in more detail in the following description. FIG. 1 illustrates a controller 10. The controller is not specified in more detail in the following text, since this is not significant to the subject matter of the invention. Typical controllers in the case of which the invention can be used are motor vehicle controllers such as ignition, injection, braking and transmission controllers etc., as well as convenience and bodywork electronics. The controller is connected to two bus lines 18, 19 for data interchange with further controllers. The controller contains a microcomputer 11 and a network interface 12. The network interface contains a CAN chip 13. The commercially available 82C200, produced by the Motorola Company, can be used, for example, as the CAN chip 13. The microcomputer 11 and the CAN chip 13 are linked to one another via a bus. The CAN chip 13 contains a differential receiver 14. A controllable switch S0 is connected to the RX0 input of the differential receiver 14. A controllable switch S1 is connected to the RX1 input of the differential receiver 14. Both switches S0, S1 can be designed as FET switches. They are connected to the microcomputer 11 via control lines 16, 17. The switches S0, S1 are operated by a signal on the control line (16, 17). Both switches S0, S1 have two switching states a and b. In its first switching state a, the switch S0 connects the RX0 input of the differential receiver 14 to a first input of a first input of a bus coupling network 15. In its first switching state a, the switch S1 connects the RX1 input of the differential receiver 14 to a second input of the bus coupling network 15. In its second switching state b, the switch S0 connects the RX0 input of the differential receiver 14 to a first point 21 on a resistor network. In its second switching state b, the switch S1 connects the RX1 input of the differential receiver 14 to a second point 22 on the resistor network. The resistor network consists of four series-connected resistors R1 to R4. The resistor R1 is connected to the supply voltage UB of the network interface 12, and the resistor R4 is connected to earth. The first connection point 21 of the resistor network is the connection point between the resistors R1 and R2, and the second connection point 22 is the connection point between the two resistors R3 and R4. The connection point between the resistors R2 and R3 is connected to a third input of the bus coupling network 15. The bus coupling network 15 contains two voltage dividers 20. The voltage divider 20 which is connected via the first switching state a of the switch S0 to the RX0 input of the differential receiver, is linked to the bus line 19. The voltage divider 20, which is connected by the first switching state of the switch S1 to the RX1 input of the differential receiver 14, is linked to the bus line 18.

Figure 2A:
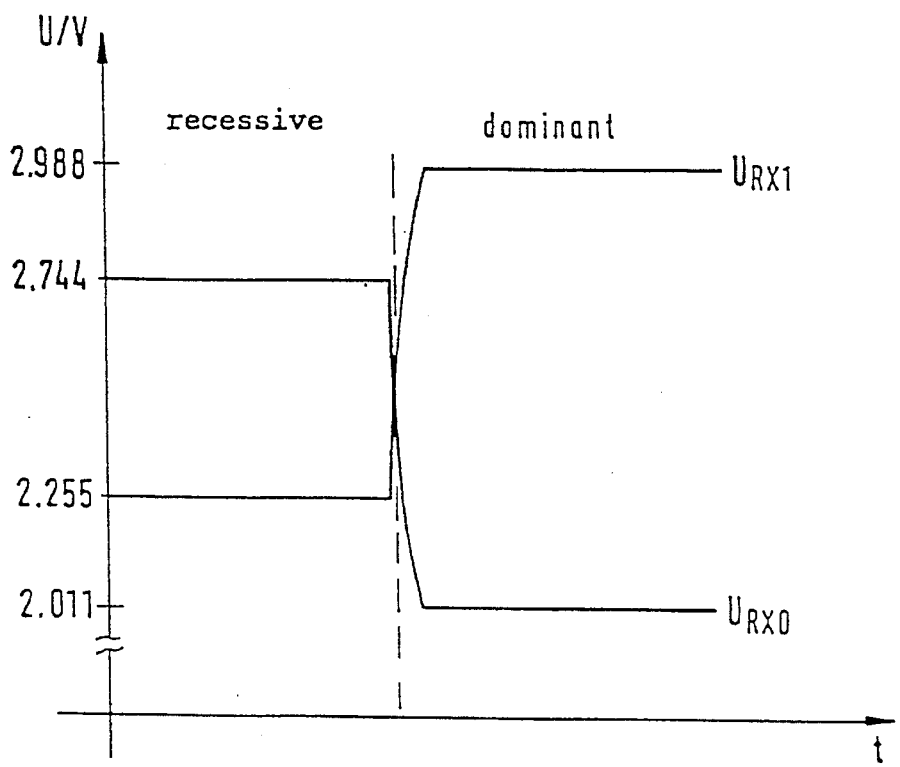
FIG. 2a shows the bit levels during two-wire operation of the network interface according to the invention.

The method of operation of the network interface 12, to the extent that it is significant for the invention, is explained in the following text with reference to FIGS. 2a to 2c. In normal operation of the network interface, both switches S0 and S1 are in the switching state a. If a data transmission is taking place via the bus lines 18, 19 to the network interface 12, then the signal levels for the individual bits at the RX0 input and RX1 input of the differential receiver 14 appear as illustrated in FIG. 2a. The CAN differentiates between the recessive bit level and the dominant bit level. In this case, a recessive bit level can be overwritten by a dominant bit level which is likewise applied to the bus lines 18, 19. For the specific example in FIG. 2a, the voltage level for the recessive bit level is 2.744 V at the RX0 input and 2.2555 V at the RX1 input. The voltage levels for the dominant bit level are 2.011 V at the RX0 input and 2.988 V at the RX1 input. Since the differential receiver 14 forms the difference between the voltage levels at the RX0 input and the RX1 input, the bit level can be picked off via the switching state and the output of the differential receiver 14. In normal operation of the two-wire interface 12, common-mode interference on the bus lines 18, 19 has no damaging effect.

For error recognition, one network subscriber (master) transmits a test message, in a specific time frame, to all the other network subscribers (slaves). This is monitored by the microcomputer 11. For this purpose a counter, for example, which can also be implemented in software, can be provided in the microcomputer 11. In normal operation, this counter continuously counts upwards. The counter is reset only when the test message has been completely received, with all the error recognition, such as bit error, cyclic redundancy error check, bit stuffing error and format error recognition has been completely received. The individual error recognition measures are in this case carried out by the network interface. If the counter now exceeds a specific value, then the microcomputer 11 interprets this as an error and then switches the switch S0 over to the control line 16, via a signal. At this point, the terminal potential UK0=2.622 V is applied to the input line RX0.

Figure 2B:
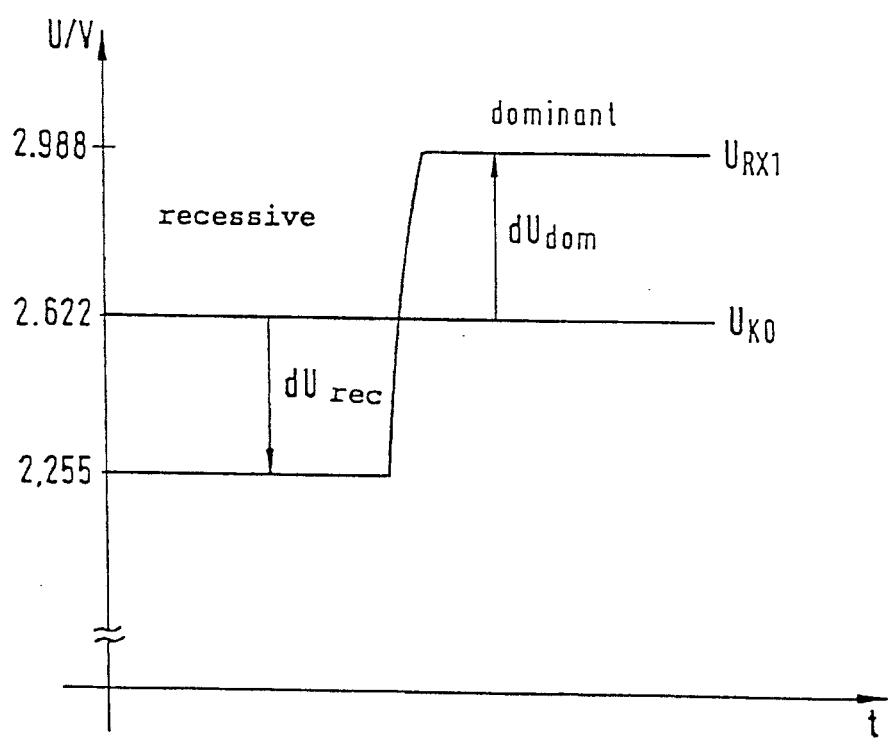
FIG. 2b shows the bit levels and the terminal potential for a first single-wire mode of a network interface according to the invention.
Figure 2C:
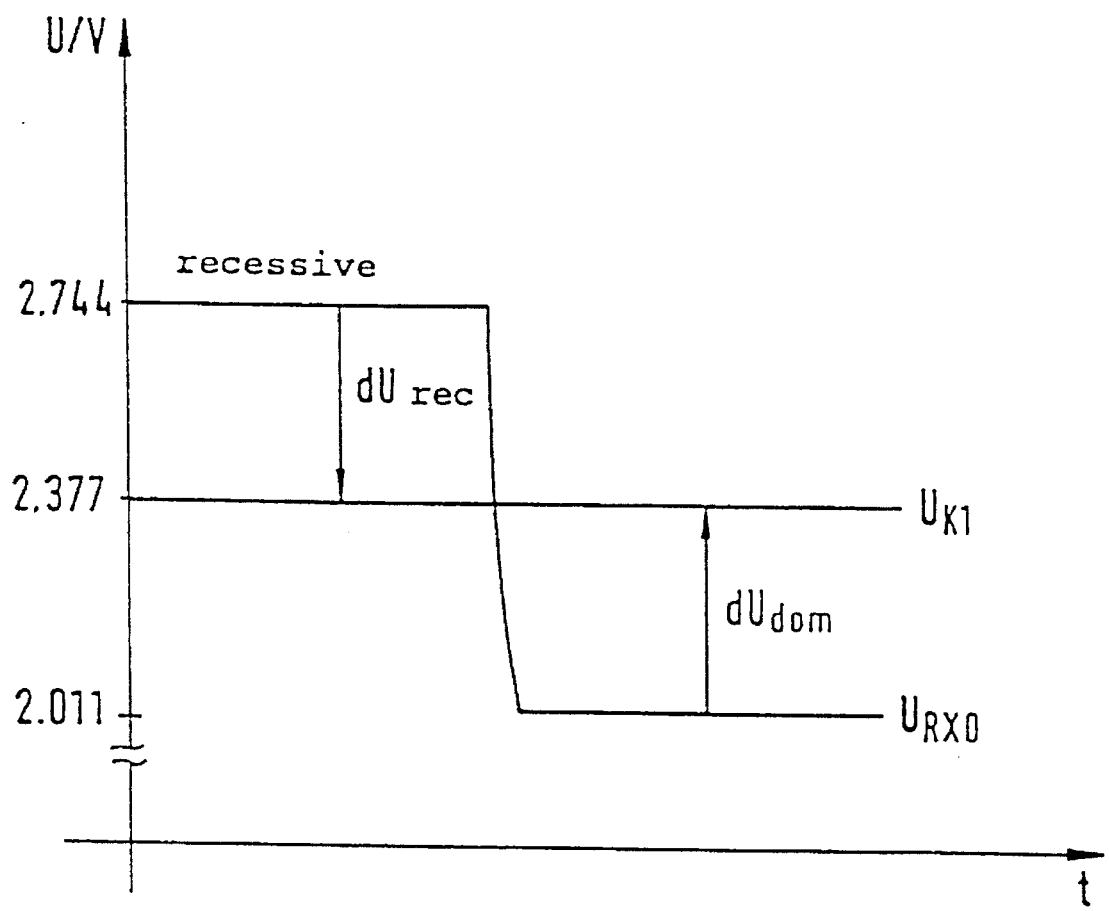
FIG. 2c shows the bit levels and the terminal potential for the second single-wire mode of the network interface according to the invention.

If the bus line 19 which is assigned to this line is actually short-circuited, then data reception can still take place via the intact bus line 18, as is illustrated in FIG. 2b. The differential receiver 14 then switches correctly again for the recessive bit level and the dominant bit level. The terminal potential UK0 is applied to the input line RX1 in the middle between the voltage levels for the recessive bit level and the dominant bit level; that is to say dU(rec)=dU(dom). The value for UK0 is calculated in accordance with the formula $$UK0=(URX1(dom)+URX1(rec))/2.$$

If any common mode interference is now transmitted to the input line RX1, for example as a result of an earth offset between two network subscribers, then the data transmission is not impeded as long as it is less than dU(rec) or dU(dom).

If the bus line 19 is not short-circuited, then no data reception takes place once again and the counter again reaches the specific value. At this point, the microcomputer 11 transmits signals via the control lines 16, 17 to the switches S0 and S1. In consequence, they are switched over. A terminal voltage UK1 is thus now present at the RX1 input of the differential receiver 14, and data reception takes place via the input line R0. This is illustrated in FIG. 2b.

The terminal potential UK1 is applied to the input line RX0, once again in the middle between voltage levels for the recessive bit level and the dominant bit level. The value for UK1 is calculated in accordance with the formula $$UK1=(URX0(dom)+URX0(rec))/2.$$

This is 2.377 V. The permissible earth offset between two network subscribers is in this case likewise dU(rec) and dU(dom).

The voltage levels specified in FIGS. 2b and 2c for UK0 and UK1 result when UB=5 V and when in addition, the resistors in the resistor network are selected as follows:

$$R1=R4=442 \text{ Ohm and } R2=R3=23.3 \text{ Ohm}.$$

If the counter now still reaches the specific value, then it has not been possible for the network interface to produce data reception again. This is the case, for example, when both bus lines 18, 19 are defective. In this case, the network interface 12 assumes a bus off state. In this state, the network interface 12 is passive, that is to say it may neither receive data from the bus nor transmit data to the bus. The network interface 12 does not attempt to take part in the bus traffic again until a reset request is present from the microcomputer 12. According to the CAN protocol, however, the network interface 12 must first have received 11 successive bits with the recessive bit level 128 times before it may transmit data to the bus again. If the reset request is present, the microcomputer 11 switches both switches S0, S1 into the position b. In consequence, the recessive bit level is permanently connected to the differential receiver 14, and the network interface 12 can quickly satisfy the condition in the CAN

We claim:

1. A network interface of a serial bus having at least a first bus line and a second bus line, comprising a differential receiver; at least a first input line and a second input line to which said differential receiver is connected, each of said input lines being connected to one of the bus lines; means for recognizing error states in a digital transmission of data via the bus; first further means which set a magnitude of a voltage difference between said two input lines (RX0, RX1) during error-free operation to a different magnitude for both bit levels; second further means which set said first input line (RX1) to a first terminal potential UK0 in accordance with the formula:

$$UK0=(U_{RX1}(dom)+U_{RX1}(rec))/2$$

if the bus line connected to said first input line (RX1) is in an error state, said second further means setting said second input line (RX0) to a second terminal potential UK1 in accordance with the formula:

$$UK1=(U_{RX0}(dom)+U_{RX0}(rec))/2$$

if the bus line connected to said second input line (RX0) is in an error state, said first and second terminal potentials being different from each other such that $U_{RX1}(dom)$ and $U_{RX1}(rec)$ represent a respective input potential for one of the two bit levels on said first input line, and $U_{RX0}(dom)$ and $U_{RX0}(rec)$ represent a respective input potential for one of the two bit levels on said second input line.

2. A network interface as defined in claim 1, wherein said means for recognizing error states in the digital transmission of data via the bus is means for recognizing short circuit in the bus lines.

3. A network interface as defined in claim 1, wherein said means for recognizing error states in the digital transmission of data via the bus is means for recognizing interruption states in the bus lines.

4. A network interface as defined in claim 1; and further comprising a plurality of points of a resistor network; and means for reproducing a reception of data via the bus and including two controllable switches connecting respectively at least one of said input lines to one bus line in a first switching state, and connecting at least one of said input lines to a respective one of said points of said resistor network in a second switching state.

5. A network interface as defined in claim 4, wherein said switches include a first switch connecting said first input line to a first one of said points of said resistor network, while said second switch connects said second input line to a second one of said points of said resistor network, said first point and said second point being different points of said resistor network.

6. A network interface as defined in claim 4, wherein said resistor network is formed so that a recessive bit level is present on said input lines when both said switches have been moved into the second switching state.

7. A network interface as defined in claim 1; and further comprising a bus coupling network connected between said input lines and the bus lines.

8. A network interface as defined in claim 7, wherein said bus coupling network includes two input voltage dividers connectable to the at least two bus lines.

* * * * *